UNITED STATES PATENT OFFICE.

AUSTIN G. DAY, OF NEW YORK, N. Y.

IMPROVEMENT IN THE MANUFACTURE OF ARTIFICIAL CAOUTCHOUC OR KERITE.

Specification forming part of Letters Patent No. 210,411, dated December 3, 1878; application filed March 8, 1877.

CASE A.

*To all whom it may concern:*

Be it known that I, AUSTIN G. DAY, of the city, county, and State of New York, have invented a process by which I am enabled to make an Improvement in the Compound termed "Kerite" or "Artificial Caoutchouc," which is described in Letters Patent of the United States granted to me on the 9th day of October, 1866, and reissued to me on the 19th of October, 1875, and which was designed chiefly as a substitute for natural caoutchouc; and I hereby declare that the following is a full, clear, and exact description of my said new process.

Other Letters Patent of the United States, of even date herewith, have been issued to me for the improved product which is the result of this process.

The object of this invention is to produce, with greater ease and certainty, and to render more definite and specific, and to materially improve the qualities and value of my improved compound, above referred to, so that my present product may be employed with better results than the previous one could be, either as an economical substitute, when desired, for natural caoutchouc, or for mixing with the latter to form, at a diminished cost, a composition capable of taking the place of ordinary india-rubber compounds.

The essential ingredients used in my present process are cotton-seed oil, linseed-oil, coal-tar or its hereinafter-stated equivalent, and sulphur; and the substance of the method which I adopt to combine them with each other, in order to make my new product, is to first mix together and heat the cotton-seed oil and coal-tar, or equivalent, and, after they have properly combined, to add the linseed-oil to the heated mixture, and then put in the sulphur, and increase the temperature of the whole to such extent and for such length of time as will produce vulcanization of the mass.

Another feature of my improvement, which is of very great importance in producing the best and most certain practical results, consists in combining with the united cotton-seed oil, linseed-oil, and coal-tar a proper quantity of wax, in the manner and for the purpose hereinafter fully described.

I may also, sometimes, mix with the wax for the same purpose, in the proportions hereinafter set forth, either paraffine or the substance called "ozocerite," which is a kind of mineral wax.

Without these ingredients, and without substantially this treatment, the improved product which I contemplate cannot be made in such a manner as to be adapted for practical business purposes; but with these ingredients and this treatment there may be employed a very great variety of other articles, and a wide variation in the proportions in which they are used, and also in the temperatures and times of heating adopted. These will cause differences in the compound produced, and these differences will extend through quite a wide range, and will increase and largely diversify the number of useful purposes for which the product may be employed; but they will be found to be differences in degree, and not in kind, so that under substantially all circumstances the essential ingredients and process which constitute the foundation of my new product, and to the action of which that product is due, will be the above-stated combination of cotton-seed oil, coal-tar or equivalent, linseed-oil, and sulphur, treated in the method herein described.

To make my said improved compound, I first mix the cotton-seed oil and coal-tar together in a suitable kettle or boiler under sufficient heat and for a sufficient length of time to cause them to unite together freely and thoroughly. The temperature ordinarily required for this purpose will be about 300° to 330° Fahrenheit, and the time generally from three to five hours. The mixture is then cooled down to, say, from 200° to 220°, or sometimes to 240°, Fahrenheit, or thereabout, and then the linseed-oil may be added. To obtain the best result, however, I prefer to let the cotton-seed oil and coal-tar stand over night to cool. If this latter course be adopted they will be found in the morning to be thoroughly combined, and I then heat them up to the above-specified temperature of from 200° to 220°, or sometimes 240°, Fahrenheit, and then add the requisite quantity of linseed-oil. When the linseed-oil has become thoroughly incorporated with the other ingredients (which usually takes about one to two hours) I add the sulphur. I generally prefer to commence to add the sulphur when the mixture is at a temperature of about 230° Fahrenheit, and to introduce it gradually, and then, as it combines with the other ingredients, I usually raise the temperture to about 275° to 300° Fahrenheit, or in that vicinity, the degree of temperature depending largely upon the length of heating-time employed. The heating of the compound may be continued until vulcanization of the mass takes place— say, in the case of a usual working batch of about one hundred pounds, for from three to five hours, or sometimes longer. When the vulcanization is complete the compound is finished, and it may then be poured into molds or pans of any desired dimensions, and allowed to cool for use or for the market.

It frequently happens, unless great watchfulness and care are employed, that the action of the sulphur, when or after it begins to combine with the oils, is so rapid as to produce a sudden and great increase in the temperature, which is caused by the generation of chemical heat, and which results in "cooking" or overheating the compound to such an extent as to seriously impair its properties, and this is particularly noticeable when the compound comes to be mixed with natural rubber. To obviate this difficulty I add a suitable quantity of vegetable wax or purified animal wax—say, in the proportion of seven ounces of wax, or thereabout, to every pound of sulphur employed. I prefer to add the wax after the sulphur is put in, and while the compound is at a temperature of about 250° to 280° Fahrenheit, or, in other words, before the compound has acquired too great consistency; but it may be added at the same time or just before the sulphur is put in. The effect of the wax is to prevent the too rapid action of the sulphur and consequent generation of chemical heat, and hence to insure a perfect and reliable product in every, or almost every, instance.

If desired, paraffine may be advantageously mixed with the wax, to prevent this too rapid action of the sulphur. When this is done I recommend that about eight ounces of the wax and paraffine, mixed together in about equal proportions, be used to every pound of sulphur. When vegetable wax alone is employed I generally use a slightly smaller quantity— say, about seven ounces to the pound of sulphur, as above specified. If ozocerite be mixed with the vegetable wax, I find that good results will be obtained when the mixture is in the proportion of about five ounces of wax to every pound of sulphur.

For the same purpose the ozocerite may also be made to take the place both of wax and paraffine mixed, and of wax alone. In this case I recommend the employment of eight ounces, or thereabout, of it to the pound of sulphur.

As above stated, the proportions of the ingredients may be greatly varied; but I recommend, as adapted to produce a compound suitable for most ordinary purposes, twenty-seven pounds of cotton-seed oil mixed with thirty pounds of coal-tar, to which may be added twenty-seven pounds of linseed-oil and from twelve to sixteen pounds, or thereabout, of sulphur. The sulphur I preferably employ in the form of the ordinary brimstone of commerce. I also may sometimes add to the compound, when it is at a temperature of from 200° to 270° or 280° Fahrenheit, or thereabout, say from one to two ounces of gum-camphor, as I find it beneficial in mixing the other ingredients, but it is not essential to the invention; and it will sometimes be found to be of considerable importance, though not essential, to add to the ingredients during the process of making the compound, and when it is at a temperature of about 230° to 240° Fahrenheit, a small quantity—say one to three ounces, or thereabout—of sulphuric, nitric, or muriatic acid, either of which may be employed, though I prefer sulphuric acid. Its use will sometimes hasten or intensify the action of the ingredients in uniting with each other, and will often be beneficial.

I have also obtained very desirable results by adding to the mixture a little oxide of iron. This should be introduced in a powder, and the form in which I prefer to employ it is the sesquioxide. It may be put in when the compound is at a temperature of 230° Fahrenheit, or thereabout, and the proportion which will answer well for the examples above given will be about one pound.

I wish it to be understood that when coal-tar is mentioned in this specification I prefer that it should be liquid coal-tar—such, for instance, as is ordinarily made at gas-works. In its usual condition at such works this substance is adapted for employment in making my compound. It may, therefore, be taken as substantially a standard or example of the character and condition of this ingredient as it should preferably be for use in my process. The substance known as "pitch" or "coal-tar pitch" might also be employed; but when it is, it is preferable that light or heavy oils, or both, should be added to it until it is as near as may be in substantially the same condition as the above-referred-to liquid coal-tar. Any practical chemist will, of course, know how to do this.

It may sometimes be difficult to procure coal-tar, and when it is the bitumens may be substituted for it. In case any bitumen which may be selected is not already in substantially the same condition as liquid coal-tar in respect of the presence in or with it of the light or heavy oils, it should, preferably, before being used, be brought to that condition, which the chemist can readily do. The same proportion of the bitumens as of the coal-tar should be used; or, if a bitumen is mixed with coal-tar, which may be done, if desired, as much of it should be employed as will equal the amount of coal-tar for which it is substituted.

It will thus be seen that coal-tar, pitch, and the bitumens are, for the purpose of my invention, the equivalents of coal-tar.

It will be observed that in putting together the ingredients which compose my compound I introduce the linseed-oil after the cotton-seed oil and coal-tar have been mixed. This will be found of great importance to the character and quality of the resulting product, and to effect a very great improvement in it as compared with the introduction of the linseed-oil at an earlier stage of the process. This mode of making my compound, whether as respects the ingredients employed or the manner of treating them, will be found to be a definite and specific rule of practical application, and the compound which is the result of this process will possess the very valuable qualities of elasticity, flexibility, indestructibility, imperviousness to water, and capacity to withstand heat and cold and the action of acids, alkalies, and the solvents of rubber. In respect of its elasticity and flexibility this compound closely resembles natural india-rubber, while in regard to its other qualities mentioned it is greatly superior to rubber. It may be put in use in the arts by being employed alone as a direct substitute for natural rubber for many of the less important purposes to which india-rubber is applied; but I generally prefer to mix it with rubber in the manner and for the purposes described in other Letters Patent of the United States of even date herewith.

It is important to remark that, although the materials and the generic mode of treatment set forth in this specification are referred to in the above-mentioned Letters Patent granted to me October 9, 1866, and reissued to me October 19, 1875, there is a substantial and clearly-distinguishable difference between the quality and value of the product made in accordance with the directions and the specific and definite ingredients here given and that which will be obtained by following my previous patent. The process and product described in the latter are entirely successful so far as the result they involve extends, and it extends over an important part of the further and better result here accomplished; but the compound which is the product of the hereinstated ingredients and process is a substantial improvement upon my former one, but is for the same general purpose.

Having thus described my invention, what I claim, and desire to secure by Letters Patent, is—

1. The above-described specific process of making a vulcanized compound for the purposes mentioned by combining and treating cotton-seed oil, coal-tar or its equivalent, linseed-oil, and sulphur, substantially in the manner set forth.

2. The above-described process of combining and treating cotton-seed oil, coal-tar or its equivalent, linseed oil, acid, and sulphur for the purpose of making a vulcanized compound, substantially in the manner set forth.

3. The combination, substantially in the manner and for the purpose described, of vegetable or animal wax with any mixture designed to form a crude kerite compound, and composed of vegetable or mineral oils, a resinous body or bodies, and sulphur.

4. The combination, substantially in the manner and for the purpose described, of ozocerite with any mixture designed to form a crude kerite compound, and composed of vegetable or mineral oils, a resinous body or bodies, and sulphur.

5. The combination, substantially as described, of oxide of iron with any mixture designed to form a crude kerite compound, and composed of vegetable or mineral oils, a resinous body or bodies, and sulphur.

AUSTIN G. DAY.

Witnesses:
  A. J. DE LACY,
  JOHN J. DIXON.